No. 848,789. PATENTED APR. 2, 1907.
L. E. WATERMAN.
CULTIVATOR.
APPLICATION FILED OCT. 22, 1906.
2 SHEETS—SHEET 1.
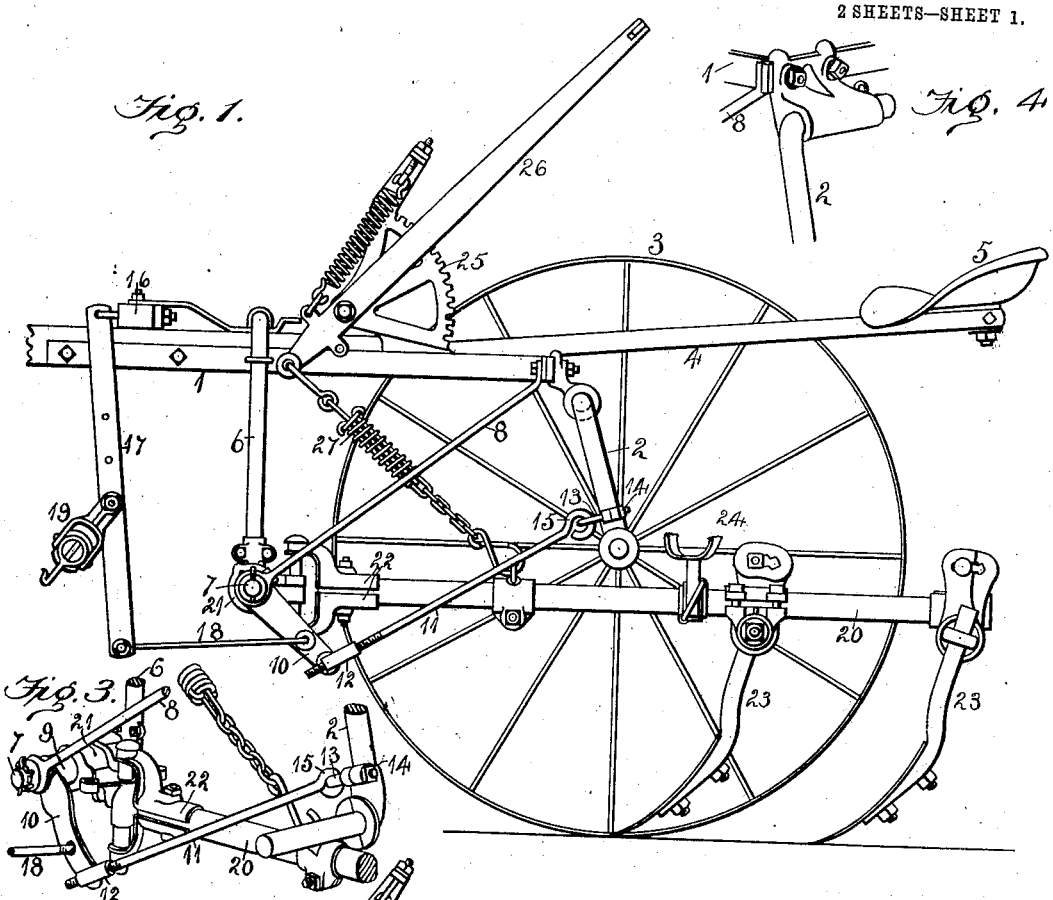
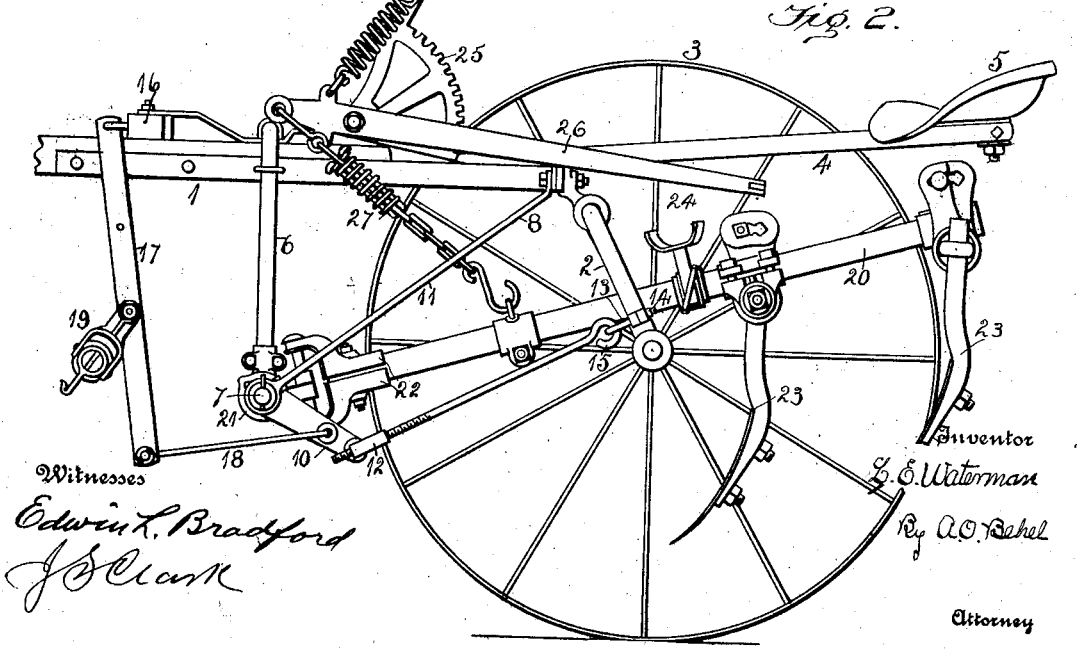
Witnesses
Edwin L. Bradford
J. S. Clark
Inventor
L. E. Waterman
By A. O. Behel
Attorney

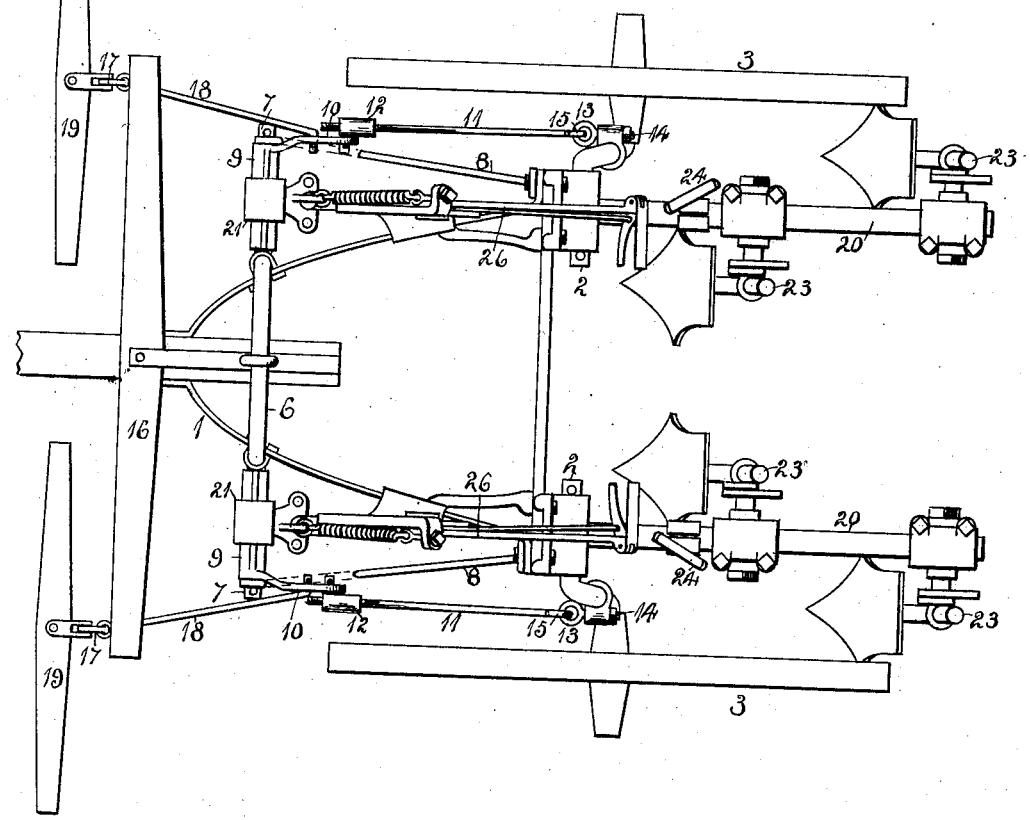

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

CULTIVATOR.

No. 848,789.  Specification of Letters Patent.  Patented April 2, 1907.

Application filed October 22, 1906. Serial No. 339,979.

*To all whom it may concern:*

Be it known that I, LEWIS E. WATERMAN, a citizen of the United States, residing at Rockford, in the county of Winnebago and State of Illinois, have invented certain new and useful Improvements in Cultivators, of which the following is a specification.

The object of this invention is to construct a cultivator in which the raising movement of the beam shifts the position of the supporting-wheels with respect to the frame in the direction of the line of draft.

In the accompanying drawings, Figure 1 is a side elevation of a cultivator containing my improvements in which the beam is partially lowered. Fig. 2 is a similar elevation in which the beam is elevated. Fig. 3 is a perspective view of forward portion of the beam and its connection with the axle of a supporting-wheel. Fig. 4 is a perspective view of the connection of the stub-axle with the main frame. Fig. 5 is a plan view of the cultivator in which the seat is not shown.

The main frame 1 of the cultivator supports two stub-axles 2 in a pivotal manner. Supporting-wheels 3 receive the stub-axles and a seat-frame 4 supports a seat 5.

An arch-bar 6 is fixedly connected to the main frame forward of the stub-axles and has laterally-extending portions 7, one for each beam, and as the connection for manipulating the beam and wheel are the same for both sides of the cultivator a description of one side will answer; but reference-numerals will be applied to both sides.

A brace-rod 8 connects the portion 7 with the main frame 1.

On the portion 7 of arch-bar 6 is pivotally mounted a sleeve 9, having a depending arm 10. A rod 11 has one end pivotally connected with the arm 10, and its other end has a movable connection with the stub-axle 2. The pivotal connection of the rod 11 with the arm 10 is by an internally-screw-threaded collar 12, which receives the screw-threaded end of the rod. The collar has a pivotal connection with the arm. This screw-thread connection permits the collar to be bodily adjusted in connection with the rod. The movable connection of the rod 11 with the stub-axle 2 is formed by an eye-bolt 13, capable of an axle adjustment in connection with the stub-axle and clamped in its adjusted position by the nut 14. The rear end of the rod 11 has an eye 15, which engages the eyebolt 13. By loosening the nut 14 the eyebolt 13 will turn in its connection with the stub-axle 2, which will permit the rod 11 to turn in its screw-threaded connection with the collar, and by tightening the nut 14 the rod will be held against axial movement. The collar 12 can be disengaged from the arm 10 and adjusted along the rod and again placed in connection with the arm.

An evener 16 is pivotally connected with the main frame in the usual manner and from the ends depend the draft-bars 17, and a draft-rod 18 connects the draft-bar 17 with the arm 10 of the sleeve 9.

A swingletree 19 has a connection with the draft-bar 17.

A beam 20 is intended to be supported at its forward end by each of the lateral portions of the arch-bar.

Around the sleeve 9 is clamped a collar 21 in a manner to move with the sleeve. To the collar 21 is connected the forward end of the beam 20 by the two-part bracket 22.

In raising or lowering the beam 20 the sleeve will be rocked in its connection with the portion 7 of the arch-bar 6; but the connection of the beam with the arch-bar is such that the beam can have the usual lateral swinging movement necessary in use.

The beam 20 supports shovels 23 and a foot-rest 24. The main frame supports a toothed segment 25, also a hand-lever 26, provided with the usual dog engagement with the toothed segment. The flexible connection 27 is formed between the hand-lever and beam. By this arrangement a connection is formed between the beams and supporting-wheels, and as the beams are supported by the arch-bar independently each beam will control a supporting-wheel. The operator can shift the position of a supporting-wheel with respect to the main frame by raising or lowering a beam. This can be accomplished by means of the hand-lever in its connection with the beam.

When the shovels are in the ground, the main frame will be balanced—that is, the weight of the operator being in rear of the axle will balance that part of the structure forward of the axle—so that there will be no neck-draft on the team. In raising the beams and attached shovels additional weight will be thrown onto the horses' necks, and this is counteracted by changing the relative position of the wheel and the pivotal connection of the stud-axle with the main frame, as shown at Fig. 2.

It has been the custom to provide a separate lever for counterbalancing the frame; but in my construction the levers that raise the beams also change the relations between the supporting-wheels and main frame.

By means of the hand-lever the working depth of the shovels can be regulated.

I claim as my invention—

1. In a cultivator, a main frame, two supporting-wheels independently connected to the main frame and capable of a bodily movement in the direction of the line of draft, two shovel-supporting beams independently connected to the main frame and capable of independent vertical movement, means for raising and lowering the beams independently, and connections whereby the said means move a supporting-wheel.

2. In a cultivator, a main frame, two supporting-wheels independently connected to the main frame and capable of a bodily movement in the direction of the line of draft, two shovel-supporting beams independently connected to the main frame and capable of independent vertical movement, and means for moving the supporting wheel and beam of one side of the main frame in unison and independently of the supporting wheel and beam of the other side of the main frame.

3. In a cultivator, a main frame, two stub-axles pivotally connected to the main frame, a supporting-wheel for each axle, two shovel-supporting beams independently connected to the main frame and capable of independent vertical movement, and means for moving the stub-axle and beam of one side of the main frame in unison independently of the stub-axle and beam of the other side of the main frame.

4. In a cultivator, a main frame, two supporting-wheels independently connected to the main frame and capable of a bodily movement in the direction of the line of draft, two shovel-supporting beams independently connected to the main frame and capable of independent vertical movement, means for varying the working depth of the shovels of one beam independently of the working depth of the shovels of the other beam, and connections between a beam and supporting-wheel whereby they move in unison.

5. In a cultivator, a main frame, an arch-bar, a sleeve having a pivotal connection with the arch-bar and provided with a laterally-extending arm, a movable axle, a wheel connected to the axle, a connection between the arm and axle, a shovel-supporting beam movable with the sleeve, and a draft connection with the arm.

6. In a cultivator, a main frame, two supporting-wheels independently connected to the main frame and capable of a movement in the direction of the line of draft, an arch-bar fixedly connected to the main frame, two shovel-supporting beams independently connected to the arch-bar and capable of an independent vertical movement, and means for moving the supporting wheel and beam of one side of the main frame in unison independently of the supporting wheel and beam of the other side of the main frame.

7. In a cultivator, a main frame, two supporting-wheels independently connected to the main frame and capable of a bodily movement in the direction of the line of draft, two shovel-supporting beams independently connected with the main frame and capable of independent vertical movement, two levers and connections whereby a lever will move a supporting wheel and beam of one side of the main frame independently of the supporting wheel and beam of the other side of the main frame.

8. In a cultivator, a main frame, two supporting-wheels independently connected to the main frame and capable of a bodily movement in the direction of the line of draft, two shovel-supporting beams independently connected to the main frame and capable of independent vertical movement, two levers, and connections whereby a lever will move a supporting wheel and beam of one side of the main frame in unison independently of the lever, supporting wheel and beam of the other side of the main frame.

9. In a cultivator, a main frame, two supporting-wheels independently connected to the main frame and capable of a bodily movement in the direction of the line of draft, two shovel-supporting beams independently connected to the main frame and capable of independent vertical movement, two levers, a connection between a lever and beam of one side of the main frame, and a connection between the beam and a supporting-wheel of the same side of the main frame, whereby a movement of the lever will move the beam and supporting-wheel independently of the beam and supporting-wheel of the other side of the main frame.

10. In a cultivator, a main frame, two supporting-wheels independently connected to the main frame and capable of a bodily movement in the direction of the line of draft, two shovel-supporting beams independently connected to the main frame and capable of independent vertical movement, a lever, a connection between the lever and beam and another connection between the beam and supporting-wheel, whereby a movement of the lever will move both the beam and supporting-wheel.

11. In a cultivator a main frame, two supporting-wheels independently connected to the main frame and capable of a movement in the direction of the line of draft, two shovel-supporting beams independently connected to the main frame and capable of independent vertical movement, two levers, a toothed quadrant for each lever, a flexible connection between a lever and a beam on one side of the main frame, and a connection between the beam and a supporting-wheel on the same side of the main frame, whereby a movement of the beam will move the supporting-wheel independently of the movement of the lever.

12. In a cultivator, a main frame, two supporting-wheels independently connected to the main frame and capable of a bodily movement in the direction of the line of draft, two shovel-supporting beams independently connected to the main frame and capable of independent vertical movement, two levers, a toothed quadrant for each lever, and connections whereby a lever will move a supporting wheel and beam of one side of the main frame in unison independently of the supporting wheel and beam of the other side of the main frame.

13. In a cultivator, a main frame, two supporting-wheels independently connected to the main frame and capable of a bodily movement in the direction of the line of draft, two shovel-supporting beams independently connected to the main frame and capable of independent vertical movement, two levers, a connection between a lever and beam of one side of the main frame, and a connection between the beam and a supporting-wheel of the same side of the main frame, whereby a movement of the lever will move the beam and supporting-wheel independently of the beam and supporting-wheel of the other side of the main frame, the connection between the beam and supporting-wheel being adjustable as to length to vary the distance between the beam and supporting-wheel.

14. In a cultivator, a main frame, two supporting-wheels independently connected to the main frame and capable of a bodily movement in the direction of the length of draft, two shovel-supporting beams independently connected to the main frame and capable of independent movement, means for moving a beam and supporting-wheel in unison, the means for one beam and supporting-wheel being independent of the means for the other beam and supporting-wheel.

LEWIS E. WATERMAN.

Witnesses:
A. O. BEHEL
E. BEHEL.